United States Patent [19]
Barnett

[11] 3,879,076
[45] Apr. 22, 1975

[54] METHOD AND APPARATUS FOR APPLYING AND REMOVING A SOFT CONTACT LENS

[76] Inventor: Robert O. Barnett, 4205 Northwest 22, Oklahoma City, Okla. 73107

[22] Filed: Dec. 27, 1973

[21] Appl. No.: 428,705

[52] U.S. Cl. ............................ 294/1 CA; 294/64 R
[51] Int. Cl. ............................................... A61f 9/00
[58] Field of Search .......... 294/1 CA, 64 R; 51/235; 128/300; 206/5 A; 248/362, 363; 271/90; 279/3

[56] References Cited
UNITED STATES PATENTS

| | | | |
|---|---|---|---|
| 1,495,881 | 5/1924 | Bunger | 271/90 UX |
| 3,091,328 | 5/1963 | Leonardos | 294/1 CA X |
| 3,129,971 | 4/1964 | Kobler | 294/1 CA X |
| 3,165,899 | 1/1965 | Shatto | 294/64 R X |
| 3,424,486 | 1/1969 | Corley | 294/64 R |
| 3,791,689 | 2/1974 | Boone et al. | 294/1 CA |

*Primary Examiner*—Richard A. Schacher
*Assistant Examiner*—Johnny D. Cherry
*Attorney, Agent, or Firm*—Laney, Dougherty, Hessin & Fish

[57] ABSTRACT

A soft contact lens applicator for applying and removing a soft contact lens and method for removing the same. The applicator having a concave shaped eyepiece to correspond with the lens positioned over the convex shaped cornea of the human eye. The eyepiece having a plurality of ducts passing therethrough in spaced relationship and communicating between the concave surface and a vacuum source attached to the eyepiece for applying a vacuum force through the ducts to aid in applying and removing the soft contact lens.

8 Claims, 7 Drawing Figures

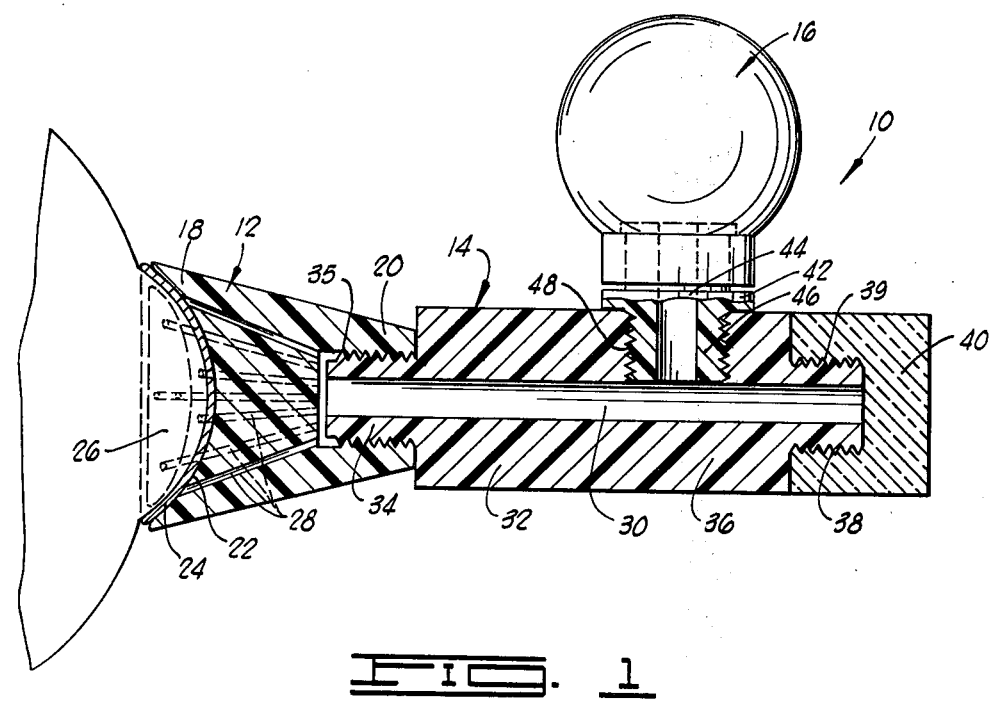
FIG. 1
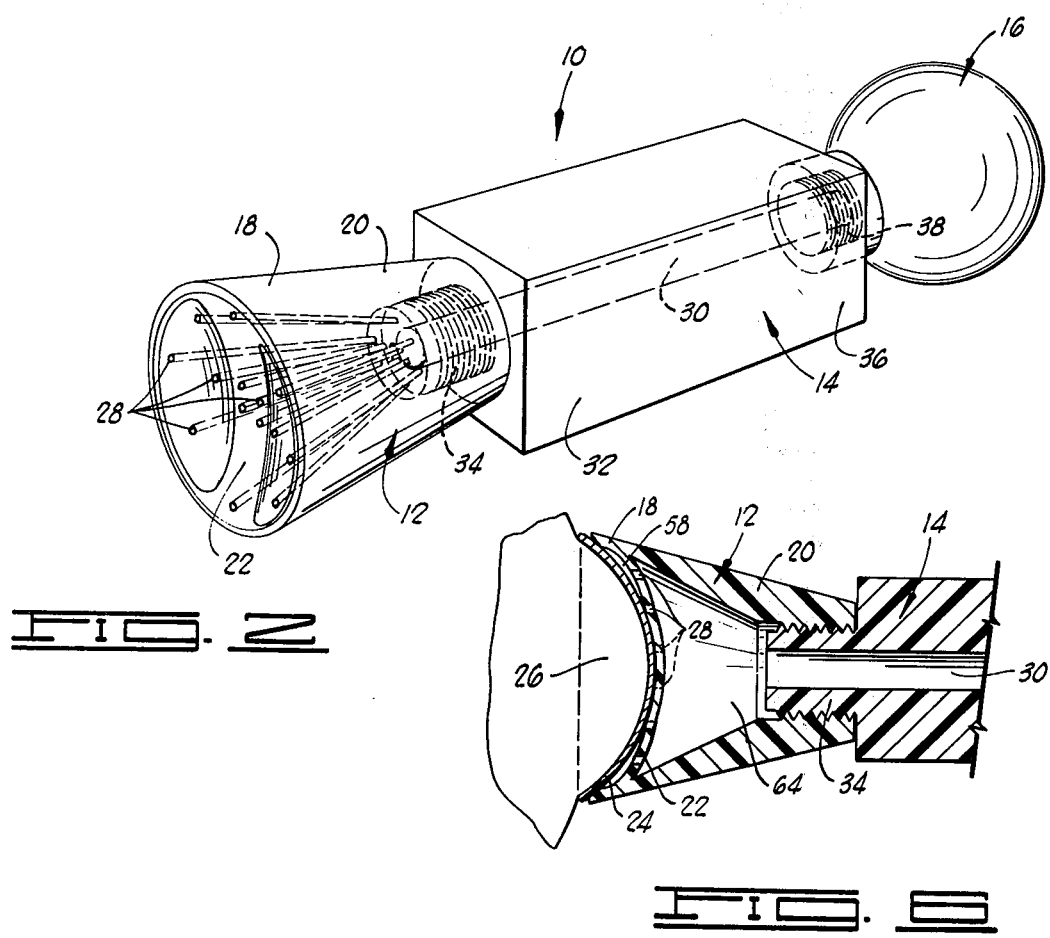
FIG. 2
FIG. 3

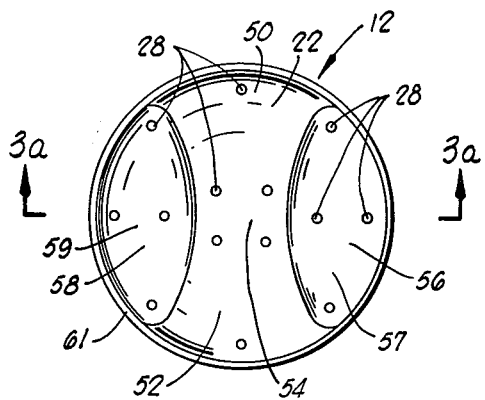
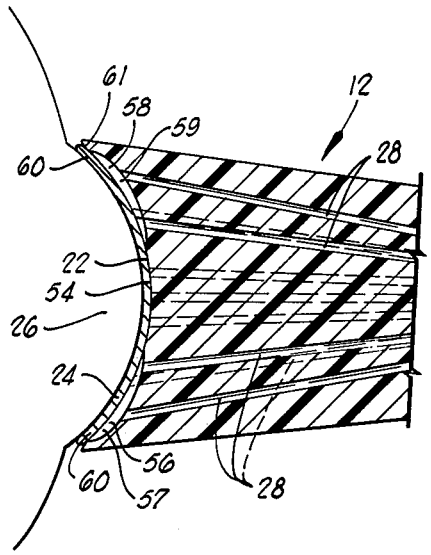
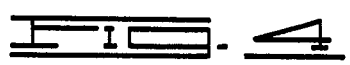
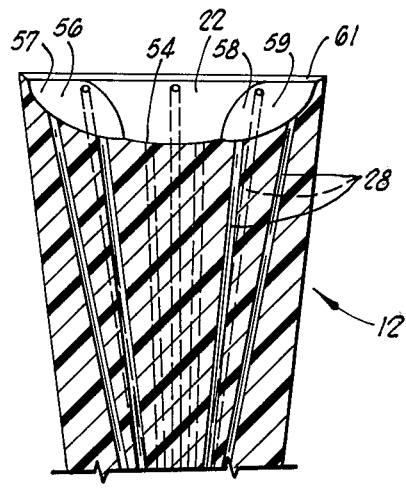
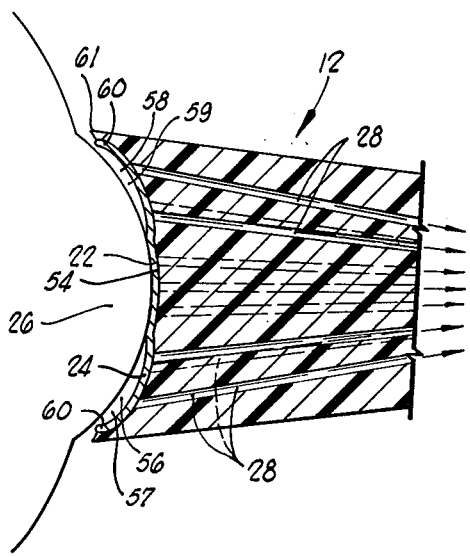
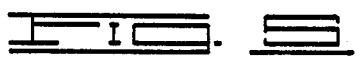

METHOD AND APPARATUS FOR APPLYING AND REMOVING A SOFT CONTACT LENS

BACKGROUND OF THE INVENTION

1. Field of the Invention

This invention relates generally to improvements in contact lens applicators, and more particularly but not by way of limitation to a soft contact lens applicator which is used to remove a soft contact lens covering the cornea of the human eye.

2. Description of Prior Art

Heretofore there have been many different types of contact lens applicators. There are instruments with different types of suction devices, eyepieces, holders, and lighting devices to aid in applying and removing the contact lens. This art is primarily directed to the application of the hard or rigid type of contact lens and does not anticipate the problems inherent with the use of the newer type of soft contact lens which is extremely flexible and pliable. By using the various contact lens applicators currently available which have a single air passageway in the eyepiece, a vacuum force is drawn on the soft lens which will tend to suck the soft lens into the passageway and the lens will be distorted and damaged. By the present invention, the concave surface of the eyepiece is intersected by a plurality of ducts for drawing a uniform vacuum across the face of the soft contact lens and thus prevents the pliable lens from being distorted and damaged by being drawn into a single passageway.

Also there is an inherent problem in removing a contact lens because of the strong capillary attraction between the lens and the eye. Because of this attraction it is often difficult to remove the lens with a contact lens applicator without hurting the eye. Again the subject invention anticipates this problem and solves this problem by the functional design of the concave surface of the eyepiece and a method of removing the soft contact lens. When the concave surface of the eyepiece is positioned against the soft contact lens, the top portion, bottom portion, center portion, and the outer periphery of the concave surface are in abutting relationship with the lens and secure the lens in place by the vacuum drawn through the ducts intersecting the surface of the eyepiece. The right and left side portions of the eyepiece are recessed and are not normally in abutting relationship with the lens. Therefore when the vacuum force is drawn through the plurality of ducts, the ducts positioned on the right and left side portions draw the right and left sides of the soft contact lens into the recessed portions. This is accomplished because the soft lens is extremely pliable. When the right and left sides of the lens are drawn into the recessed area the seal is broken and in effect the capillary attraction is released between the lens and the eye and the contact lens can now easily be withdrawn from the eye without excessive force and possible injury to the eye.

SUMMARY OF INVENTION

The present invention contemplates a soft contact lens applicator for applying and removing a soft contact lens from the eye. The applicator includes an eye piece member having a concave surface on the first end portion thereof with a plurality of ducts communicating with the concave surface in spaced relationship thereon and vacuum means attached to the second end portion of the eyepiece and in communication with the ducts for applying a vacuum force uniformly through the ducts to aid in applying and removing the soft contact lens.

An object of the invention is to provide apparatus to safely apply and remove a soft contact lens from the human eye.

Another object of the invention is to provide a method and apparatus for removing the soft contact lens by releasing the seal or capillary attraction between the eye and the lens thus preventing the use of excessive force in removing the lens and possible injury to the eye.

A further object of the invention is to prevent the soft lens from becoming distorted and damaged when the lens is removed.

Other objects and advantages of the invention will be evident from the following detailed description when read in conjunction with the accompanying drawings which illustrate various embodiments of the invention.

BRIEF DESCRIPTION OF THE DRAWINGS

FIG. 1 is a side view partially in section and partially in elevation of the soft contact lens applicator.

FIG. 2 is a perspective view of a slightly modified form of the soft contact lens applicator with the vacuum means positioned at the end of a conduit member rather than on top of the conduit member as shown in FIG. 1.

FIG. 3 is a front view of the concave surface of the eyepiece member.

FIG. 3a is a sectional view taken along line 3a—3a of FIG. 3.

FIG. 4 is a sectional view of the eyepiece member similar to FIG. 3a illustrating the eyepiece member in abutting relationship with the soft contact lens secured to the eye.

FIG. 5 is a similar view as shown in FIG. 4, but illustrates the vacuum force drawing the edges of the soft contact lens into the recessed portions of the eyepiece member.

FIG. 6 is a sectional view of an alternate embodiment of the eyepiece member.

DETAILED DESCRIPTION OF THE PREFERRED EMBODIMENT

FIG. 1 illustrates the soft contact lens applicator designated by the general reference character 10. The applicator 10 is generally comprised of an eyepiece member 12, a conduit member 14, and a vacuum source 16 which in this illustration is a rubber bulb.

The eyepiece member 12 includes a first end portion 18 and a second end portion 20. The first end portion 18 includes a concave surface 22 formed therein which engages the soft contact lens 24 which is secured to the cornea of the eye 26.

The surface 22 is illustrated further by having a plurality of ducts 28 communicating with and extending from the surface 22 through the eyepiece member 12 and converging to the position in the second end portion 20 where the ducts 28 are in communication with a bore 30 extending through the conduit member 14.

The conduit member 14 includes a first end portion 32 having an externally threaded portion 34 for threadably engaging an internally threaded portion 35 of the second end portion 20 of the eyepiece member 12. Conduit member 14 has a second end portion 36 having an externally threaded portion 38 for threadably engaging an internally threaded portion 39 of a transparent end member 40 which seals the end of bore 30 but because of its transparency allows an outside source of light to be transferred through the bore 30 and into ducts 28 to aid in adjusting the applicator 12 to the eye 26. It should be pointed out that although conduit member 14 is used primarily for conducting a vacuum from the vacuum source 16 to the eyepiece member 12, the conduit member 14 can also be used in holding the applicator 10 as the contact lens 24 is applied or removed.

Vacuum source 16 is secured to a vacuum source connecting member 42 having a bore 44 extending therethrough and in communication with the vacuum source 16 and the bore 30 of the conduit member 14. Connecting member 42 has an externally threaded portion 46 for threadably engaging an internally threaded portion 48 of the conduit member 14 thus securing the connecting member 42 to the conduit member 14.

FIG. 2 is a perspective view of a slightly modified applicator 10 substantially similar to the applicator shown shown in FIG. 1, but without the transparent end member 40. In this illustration the vacuum source 16 is secured to the extended threaded portion 38 of the second end portion 36 of the conduit member 14 rather than securing the vacuum source 16 to a vacuum source connecting member 42 as shown in FIG. 1. The vacuum source 16 being in communication with the bore 30 draws a vacuum through the ducts 28 and the bore 30.

FIG. 3 is a front view of the concave surface 22 of the eyepiece member 12. The surface 22 includes a top portion 50, a bottom portion 52, a center portion 54, a right side portion 56, a left side portion 58, and an outer periphery 61. Each portion of the surface 22 is intersected by at least one of the ducts 28 extending through the eyepiece member 12. Right side portion 56 and left side portion 58 include recessed portions 57 and 59, respectively, recessed from the concave surface 22. The lens 24 having corresponding portions as described above on surface 22.

FIG. 3a is a sectional view of the eyepiece member 12 taken along line 3a—3a of FIG. 3 and further illustrates the recessed portion 57 of the right side portion 56 and the recessed portion 59 of the left side portion 58 of the concave surface 22.

FIG. 4 is a sectional view of the eyepiece member 12 shown in FIG. 3a and in abutting relationship with the soft contact lens 24 secured to the cornea of the eye 26. At this position, no vacuum has been drawn through the ducts 28 and the outer periphery 61, center portion 54 and the top portion 50 and bottom portion 52 (not shown), are positioned against the surface of the contact lens 24. It should be noted that in this position the recessed portion 57 of the right side portion 56 and the recessed portion 59 of the left side portion 58 are not in contact with the lens 24.

FIG. 5 is similar to the view shown in FIG. 4 and illustrates how the seal or capillary attraction securing the lens 24 to the eye 26 is broken so that the lens can easily be removed. When the vacuum force is applied by the vacuum source 16, through the ducts 28, the portions of the concave surface 22 already positioned against the surface of the lens 22 continue to hold the lens in place on the cornea of the eye 26. But because the lens 22 is extremely flexible and pliable, the portion of the lens 22 opposite the recessed portions 57 and 59 of the right side portion 56 and the left side portion 58 are drawn into these recessed portions by the vacuum force and the edges 60 of the lens 24 are lifted from the sides of the cornea of the eye 26 thus relieving the capillary attraction between the cornea 26 and the lens 24 and breaking this seal so that the lens 24 can now be removed easily and safely without the use of excessive vacuum force in removing the lens.

The lens 24 would be applied to the eye 26 by placing the lens 24 in the eyepiece 12 and drawing a slight vacuum through ducts 28 using vacuum source 16 to hold the lens 24 in place. The lens 24 would now be centered over the cornea of the eye 26 and the vacuum force from vacuum source 16 would now be relieved thus releasing the lens 24 to be secured to the cornea 26 by capillary attraction.

FIG. 6 is shown to illustrate an alternate embodiment of eyepiece member 12 and may be considered preferable to the member 12 shown in the above figures. In FIG. 6, the ducts 28 are shown extending from the concave surface 22 only a short distance before communicating with a vacuum chamber 64 which extends from the first end portion 18 to the second end portion 20 and likewise is in communication with bore 30 of the conduit member 14. The ducts 28 being of shorter length are less likely to become restricted or closed and therefore a more uniform vacuum or pressure can be applied to the convex surface of the lens 24.

Changes may be made in the construction and arrangement of parts or elements of the various embodiments as disclosed herein without departing from the spirit and scope of the invention as defined in the following claims.

What is claimed is:

1. A soft contact lens applicator for applying and removing a soft contact lens from the eye comprising:

an eyepiece member having a first end portion with a concave surface formed thereon for engaging the soft contact lens, a second end portion, and a plurality of ducts intersecting the concave surface in spaced relation on the concave surface and communicating the concave surface with the second end portion, said concave surface being formed to include a top portion, a bottom portion, a center portion, a right side and a left side portion, the right side portion and the left side portion each including a recessed portion recessed from the concave surface of the top portion, the bottom portion, and the center portion, so that when the soft contact lens is removed the sides of the lens are drawn by vacuum force into the recesses of the right side portion and the left side portion thus breaking the seal between the eye and the lens; and vacuum means attached to the second end portion of said eyepiece member and in communication with the plurality of ducts for applying a vacuum force through the ducts to aid in applying and removing the soft contact lens.

2. The applicator as defined in claim 1 wherein said eyepiece member is further characterized to include at least one duct intersecting, respectively, each surface of the top portion, the bottom portion, the center portion, the recessed portion of the left side portion and the recessed portion of the right side portion of the concave surface of said eyepiece member.

3. A soft contact lens applicator for applying and removing a soft contact lens from the eye comprising:

an eyepiece member having:
- a first end portion with a concave surface formed thereon for engaging the soft contact lens, the concave surface characterized to include a top portion, a bottom portion, a center portion, a right side portion, and a left side portion, the right side portion and the left side portion each including a recessed portion recessed from the concave surface of the top portion, the bottom portion, and the center portion;
- a second end portion; and
- a plurality of ducts intersecting the concave surface in spaced relationship and communicating the concave surface with the second end portion, said eyepiece member characterized to include at least one duct intersecting respectively each surface of the top portion, the bottom portion, the center portion, the recessed portion of the right side portion and the recessed portion of the left side portion of the concave surface of said eyepiece member; and
- vacuum means attached to the second end portion of said eyepiece member and in communication with the plurality of ducts for applying a vacuum force through the ducts to aid in applying and removing the soft contact lens.

4. The applicator as defined in claim 3 wherein said vacuum means is further characterized to include:
- a conduit member having a first end portion, a second end portion, and a bore running therethrough, the second end portion of said eyepiece member secured to the first end portion of the conduit member and the ducts in said eyepiece member in communication with the bore of the conduit member; and
- a rubber bulb secured to the second end portion of the conduit member and in communication with the bore.

5. The applicator as defined in claim 3 wherein said vacuum means is further characterized to include:
- a conduit member having a first end portion, a second end portion, a first bore running therethrough, a second bore intermediate the first end portion and the second end portion and intersecting the first bore at substantially right angles;
- a rubber bulb secured to the conduit member and in communication with the second bore; and
- a transparent end member secured to the second end portion of the conduit member sealing the first bore at one end thereof and allowing outside light to be transmitted through said transparent end member through the first bore of the conduit member, and through the ducts of said eyepiece member to aid in adjusting the applicator on the soft contact lens.

6. The applicator as defined in claim 3 wherein the plurality of ducts of said eyepiece member extend through said eyepiece member from the concave surface to the second end portion.

7. The applicator as defined in claim 3 wherein said eyepiece member is further characterized to include a vacuum chamber intermediate the first end portion and the second end portion of said eyepiece member, the vacuum chamber in communication with the plurality of ducts and said vacuum means.

8. A method of removing a soft contact lens having a surface which includes a top portion, a bottom portion, a center portion, a right side portion, a left side portion, and an outer periphery, secured to the surface of the eye comprising the steps of:
- applying a uniform vacuum force across the surface of the contact lens;
- drawing by vacuum force the right side portion and the left side portion intermediate the center portion and the outer periphery of the soft contact lens away from the surface of the eye while maintaining the center, top and bottom portions in contact with the surface of the eye; and
- releasing the outer periphery of the soft contact lens adjacent to the right and left side portions of the soft contact lens from the surface of the eye thereby releasing the seal between the surface of the eye and the soft contact lens and allowing air therebetween.

* * * * *